Nov. 24, 1931. A. F. PYM 1,833,123
MACHINE FOR USE IN THE MANUFACTURE OF SHOES
Filed Feb. 4, 1929 2 Sheets-Sheet 1
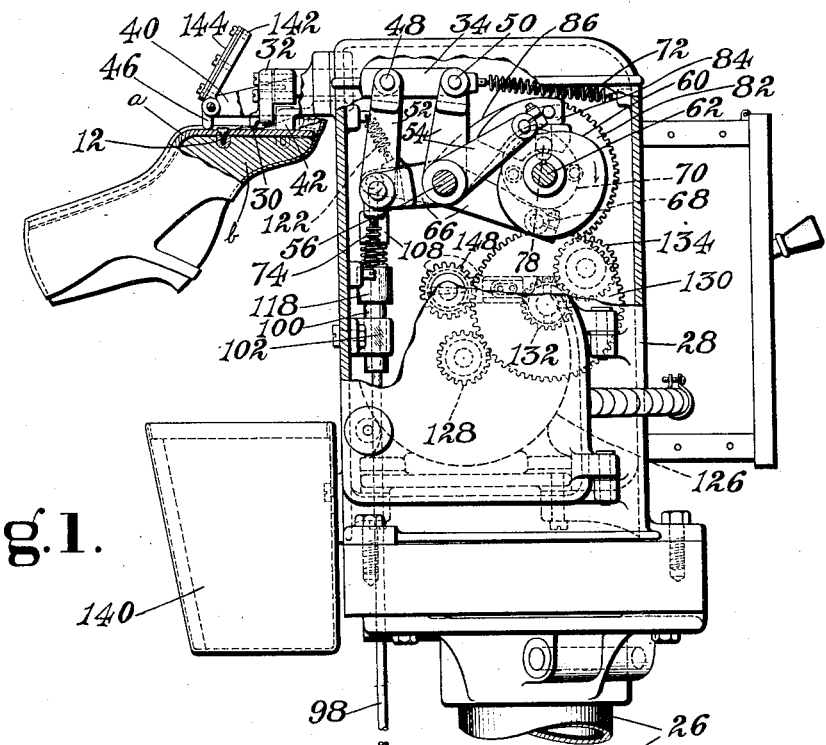
Fig.1.
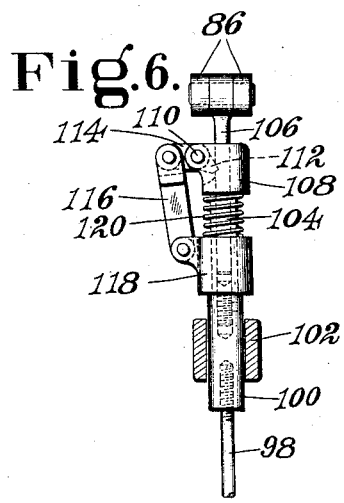
Fig.6.
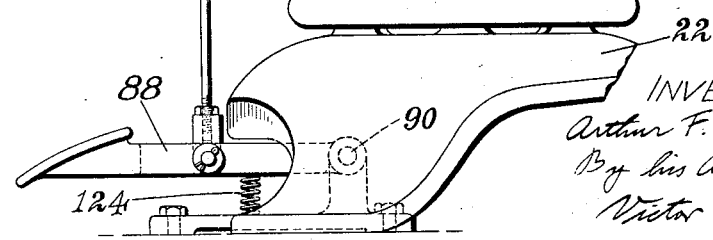
INVENTOR-
Arthur F. Pym
By his Attorney
Victor Cobb

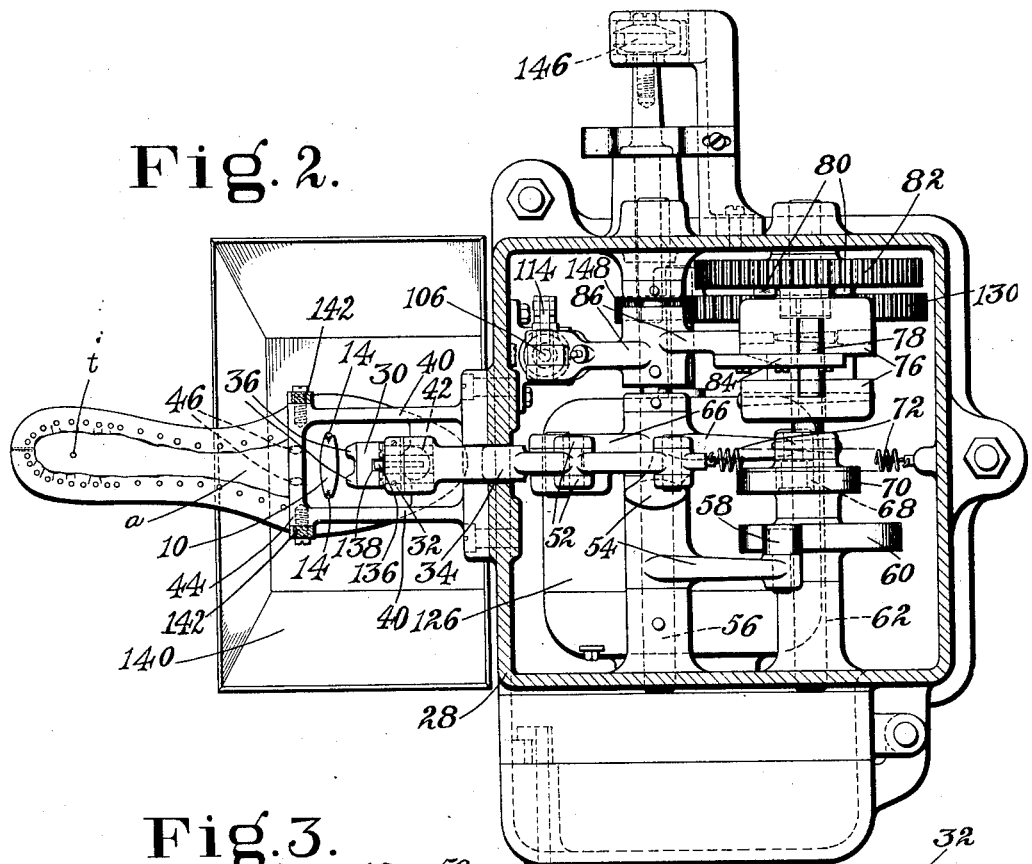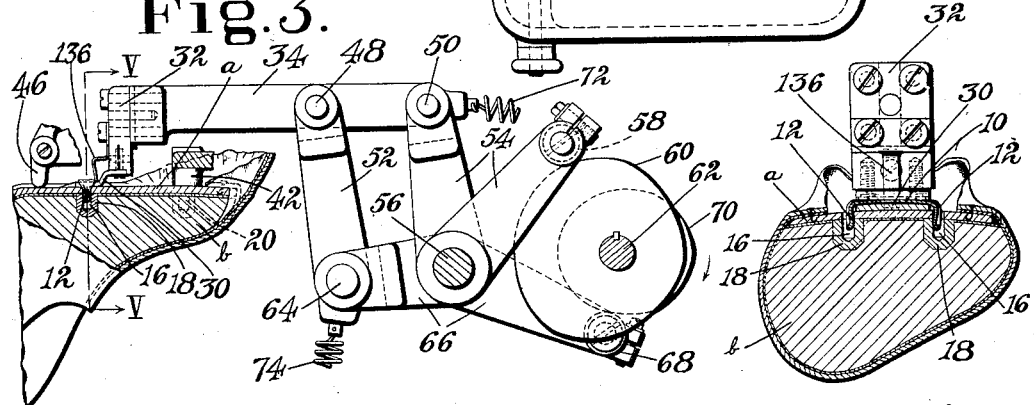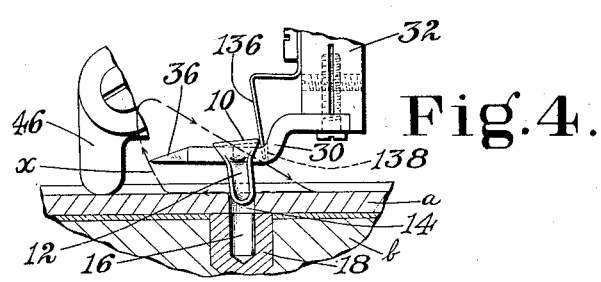

Patented Nov. 24, 1931

1,833,123

UNITED STATES PATENT OFFICE

ARTHUR F. PYM, OF SWAMPSCOTT, MASSACHUSETTS, ASSIGNOR TO UNITED SHOE MACHINERY CORPORATION, OF PATERSON, NEW JERSEY, A CORPORATION OF NEW JERSEY

MACHINE FOR USE IN THE MANUFACTURE OF SHOES

Application filed February 4, 1929. Serial No. 337,411.

This invention relates to machines or mechanisms for use in the manufacture of shoes. An object of the invention is to provide means for removing from a shoe on a last a device used for positioning the insole in proper relation to the last during a portion of the manufacturing operations on the shoe, for example a device of the type disclosed in Letters Patent No. 1,736,276 granted on November 19, 1929, upon an earlier application of mine, and disclosed also in another form in an application of A. R. Schoenky, Serial No. 336,697, filed on February 1, 1929. Such a device comprises a member having a body portion which overlies the bottom face of the insole and spaced projections which extend through holes in the insole into holes in the last, the body portion of the member being preferably resilient and so formed as to act by its resiliency to cramp the projections in the holes in the last by tipping them toward each other and thus to hold the device firmly in place. At a certain stage in the manufacture of the shoe, for example after the pulling-over, side-lasting and heel-lasting operations and before the toe-lasting operation, it becomes necessary to remove the device from the shoe. This operation not only requires considerable force because of the manner in which the projections are cramped in the holes in the last, but also involves danger of distorting or breaking the device unless the force is applied in the proper manner.

The present invention provides means constructed to remove quickly from a shoe an insole-positioning device of the character above described without danger of distorting or breaking the device. As herein illustrated there is provided a tool with a beveled edge which by operating mechanism is moved along the bottom face of the insole in a direction parallel to that face to insert it between the body portion of the insole-positioning device and the insole and is then moved in a direction heightwise of the shoe to remove the device from the shoe. The tool in the construction shown is so formed as to engage the device close to the projections that extend into the holes in the last, and the tool is operated in such manner as to withdraw the different projections simultaneously from the holes. By engaging the device in that manner it is removed with less force and with less strain thereon than if the force were applied midway between the projections, in which case the tendency would be to cramp the projections still harder in the holes in the last; and by withdrawing the different projections simultaneously from the holes danger is avoided of such distortion or breakage as might result from the twisting of either of the projections in the hole into which it extends.

The above and other features of the invention, including also novel means for determining a proper operative relation between the removing tool and the shoe, means for discharging the insole-positioning device from the tool, and various novel details of construction and combinations of parts, will now be more particularly described by reference to the accompanying drawings and thereafter pointed out in the claims.

In the drawings,

Fig. 1 is a view in side elevation of a machine in which the invention is embodied, with parts broken away and parts in section;

Fig. 2 is a plan view of the machine with parts broken away and others removed;

Fig. 3 is a view partly in side elevation and partly in section illustrating how the tool that removes the insole-positioning device from the shoe is moved into position between the body portion of the device and the insole;

Fig. 4 is a view similar to a portion of Fig. 3, illustrating further the path of movement of the tool;

Fig. 5 is a cross-sectional view on the line V—V of Fig. 3, illustrating further the relation of the tool to the insole-positioning device; and Fig. 6 is a detail view in front elevation showing a portion of the means for controlling the operation of the machine.

The invention is herein illustrated by reference to its use in removing from a shoe an insole-positioning device of the particular construction disclosed in the above-mentioned Schoenky application, but it will be understood that it is not thus limited in utility.

That device comprises a resilient sheet metal member so formed as to provide a body portion 10 to overlie the bottom face of an insole a on a last b and to provide at the opposite ends of its body portion projections 12 to extend through holes 14 in the insole into holes 16 formed in metal bushings 18 inserted in the bottom portion of the last, the construction being such that the body portion 10 of the device, which presents initially a lengthwise concave face toward the insole, tends by its resiliency, when the device is in operative position, to tip the projections 12 toward each other and thus acts to cramp the projections in the holes 16 to hold the device firmly in place. It will be seen that the holes 16 illustrated as co-operating with the positioning device to position and hold the insole in proper relation to the last are spaced apart widthwise of the forepart of the last, and it will be understood that the device is applied when the insole is assembled with the last and remains in place during a portion of the manufacturing operations on the shoe, as herein illustrated until after the pulling-over, side-lasting and heel-lasting operations have been performed. In accordance with one method of shoe manufacture the holes 16 in the last and a third hole therein shown by dotted lines at 20 (Fig. 3) are used in positioning the last and shoe for the toe-lasting operation, as disclosed in Letters Patent No. 1,674,060, granted upon my application on June 19, 1928, and it is for the purpose of removing the insole-positioning device prior to that operation, or at such other stage in the manufacture of the shoe as may be desired, that the machine herein shown as embodying the present invention is provided.

The machine comprises a base 22, a column 24 and a sleeve 26 vertically adjustable in the column 24 and supporting on its upper end, among other parts, a head casting 28 which serves as a housing for various operating parts of the machine. For removing the insole-positioning device from the shoe there is provided a tool or remover 30 which is secured to a block 32 fast on the front end of a substantially horizontal tool support or arm 34. The tool 30 comprises a plate arranged to extend in generally parallel relation to the bottom face of the insole and having a substantially plane insole-engaging face, the tool also having spaced forward projections 36 beveled on their upper faces to provide thin knife-like edges in the plane of the lower face of the tool adapted to be inserted readily between the bottom face of the insole and the body portion 10 of the insole-positioning device as the tool is moved forwardly along the bottom face of the insole in a manner hereinafter explained. The tool is of a width approximating the length of the body portion 10 of the device, so that it engages the device close to the projections 12 that extend into the holes 16 in the last. The provision of spaced projections 36 instead of a continuous straight operating edge on the tool 30 is of advantage because of the slight lateral convexity of the forepart of the shoe bottom on some styles of shoes, since under such conditions the spaced projections can be more readily inserted between the insole and the positioning device. It will be understood that in its forward movement the tool acts as a wedge to lift the insole-positioning device to a certain extent and thereby partially to withdraw the projections 12 from the holes in the last. Thereafter the tool is moved upwardly, heightwise of the shoe, in a manner also hereinafter explained, to complete the removal of the device from the shoe.

For convenience and speed in presenting a plurality of shoes in succession to the machine, the construction herein shown is such that each shoe is supported in the hands of the operator during the operation of the machine. To assist in positioning the shoe in proper relation to the tool 30 and to the path of movement of the tool, there is secured on the front of the housing 28 a bracket 40 provided with a finger 42 for engaging the bottom face of the insole at the toe end of the shoe and having at its front end a transverse bar 44 (Fig. 2) provided with fingers 46 for engaging the insole in locations spaced apart widthwise of the shoe at the rear of the insole-positioning device. A shoe rest having a three-point support or bearing for the bottom of the shoe is thus provided, whereby that portion of the bottom face of the insole along which the tool 30 advances in its forward movement is located in the proper plane in relation to the tool and to the path of its movement to insure that the tool will enter properly between the body portion 10 of the insole-positioning device and the insole. The bracket 40 is so formed as to afford the operator a view of the tool 30 and of that portion of the bottom of the forepart of the shoe where the insole-positioning device is located to enable him to determine when the shoe is in proper relation to the tool lengthwise and laterally and in respect to orientation about a vertical axis. The proper operation of the machine does not require any very exact positioning of the shoe in these respects, and accordingly in the construction shown this is left to the control of the operator.

The tool-supporting arm 34 extends forwardly through an opening in the front of the housing 28, and the rear portion of the arm is pivotally supported within the housing at 48 and 50 respectively upon the forked upper end of a link 52 and the forked upper end of one arm of a bell-crank lever 54. The lever 54 is pivotally mounted on a rod 56 supported in the housing 28, and its other arm carries a roll 58 engaged by a cam 60 fast on a cam shaft 62 rotatable in bearings in the housing 28. The lower end of the link 52 is pivoted at 64 on one arm of a bell-crank lever 66 pivotally mounted on the rod 56, the other arm of this lever having thereon a roll 68 engaged by a cam 70 on the cam shaft 62. It will thus be evident that the cam 60 acts through the bell-crank lever 54 to impart forward movement to the arm 34 and the tool 30, accompanied by idle swinging movement of the link 52 about its pivotal connection 64 with the bell-crank lever 66, and that the cam 70 acts through the bell-crank lever 66 and the link 52 to impart upward swinging movement to the arm 34 and the tool 30 about the pivotal connection 50 between the arm and the bell-crank lever 54. It will be understood that these movements occur in proper time relation to each other to cause the tool 30 to be inserted between the body portion of the insole-positioning device and the insole and to be lifted to remove the device from the shoe as hereinbefore explained. The path of the tool in its forward and upward movements and in its return to starting position is indicated by a broken line and arrows at x in Fig. 4. A spring 72 connected at one end to the arm 34 and at its other end to the housing 28 acts to impart to the arm and the tool return movement lengthwise of the shoe as permitted by the cam 60, and a spring 74 connected to the lower end of the link 52 and to the housing assists gravity in imparting to the arm and the tool their return downward movement as permitted by the cam 70.

In order that the tool 30 shall be inserted properly between the insole and the body portion 10 of the insole-positioning device, it is desirable that the tool slide along the bottom face of the insole. To insure such a relation between the tool and the insole, the cam 70 is so formed that when the machine is in starting position and before a shoe is presented in engagement with the shoe rest fingers 42 and 46, the tool 30 is positioned with its lower insole-engaging face somewhat below the plane determined by the lower ends of these fingers, so that when the shoe is presented the tool is lifted by engagement of the insole therewith. Such lifting of the tool causes the bell-crank lever 66 to carry its roll 68 a short distance away from the cam 70, as indicated in Fig. 1. When the machine is operated the cam as it turns again assumes control of the tool and lifts it from the shoe at the proper time. It will be understood that the lightness of the parts is such that this lifting of the tool by the shoe imposes no objectionable burden on the operator.

The cam shaft 62 is operated through a clutch which need not be described in detail, since any suitable well-known form of clutch may be used. The clutch shown is of the pin type, comprising a drum 76 fast on the cam shaft 62 and carrying a pin 78 slidable therein lengthwise of the shaft, this pin being shown partly in full and partly in dotted lines in Fig. 2. One end of the pin is arranged to co-operate with one or the other of two diametrically opposite pins 80 carried by a gear wheel 82 rotatably mounted on the cam shaft 62 to provide a driving connection between the gear wheel and the cam shaft. The clutch pin 78 is controlled in a well-known manner characteristic of clutches of this type by a spring (not shown) and a wedge member 84 carried by a bell-crank lever 86 pivoted on the rod 56. The lever 86 is operated to release the clutch pin and thereby to start the machine by means of a treadle 88 pivoted at 90 on the base 22. It is preferable, although not essential, that the machine be limited to a single cycle of operations at each depression of the treadle, and, accordingly, the connections provided between the treadle and the lever 86 are such as to bring this about. Connected to the treadle is a rod 92 to the upper end of which is adjustably connected by means of a block 94 and a clamping screw 96 another rod 98, and to the upper end of the rod 98 is secured a cylindrical member 100 vertically slidable in a bearing member 102 secured to the housing 28. To the upper end of the member 100 is secured a member 104 of smaller diameter which has therein a central vertical bore to receive slidingly the lower end of a rod 106 the upper end of which is pivotally connected to the end of the clutch-actuating lever 86. At its upper end the member 104 is enlarged to provide a head 108, and in a slot in one side of this head there is pivotally mounted at 110 a pawl 112 which is arranged to enter a notch formed in the rod 106, as illustrated in Fig. 6, and thereby to provide a connection between the treadle-operated member 100 and the rod 106 for moving the lever 86 to start the machine by downward movement of the treadle. To cause the machine to come to a stop at the end of a single revolution of the cam shaft 62, even though the operator should continue to hold the treadle depressed, there is provided means for controlling the pawl 112 in such manner as to break the connection between the treadle and the lever 86 in the latter portion of the downward movement of the treadle. For this purpose the pawl 112 is provided with an arm 114 connected by a link 116 to a block 118 slidingly mounted on the member 104 and resting normally on the upper end of the member 100, as shown in Fig. 6. Between the block 118 and the head 108 there is mounted a spring 120 which tends to force the block 118 downwardly and thereby to hold the pawl 112 in the notch in the rod 106. When the treadle is depressed the block 118 is carried downwardly into engagement with the bearing member 102, whereupon its downward movement is stopped while the downward movement of the head 108 continues in response to the further downward movement of the treadle. This causes the link 116 to act on the pawl 112 to swing the pawl out of the notch in the rod 106 and thereby to release this rod and the lever 86. A spring 122 (Fig. 1) then acts on the lever 86 to return the wedge member 84 into position to break the connection between the driving gear 82 and the cam shaft 62 at the end of a single revolution of the cam shaft. When the treadle is released by the operator, a spring 124 acts to lift it and the parts connected therewith and thereby to return the pawl 112 into position to enter the notch in the rod 106, the pawl being forced into the notch when it arrives in that position by the action of the spring 120 on the block 118 and the link 116.

The machine here shown is so designed as to be driven by an electric motor 126 located within the housing 28. The motor carries a pinion 128 in driving engagement with a gear wheel 130, and mounted to rotate with this gear wheel is a pinion 132 which, through an idler gear 134, drives the gear wheel 82. Through these connections the gear wheel 82 is driven continuously at a much slower speed than the motor shaft.

There is further provided means for discharging the insole-positioning device from the removing tool 30 to avoid any tendency for the device to remain on the tool after being removed from the shoe. This means comprises a leaf spring 136 secured to the block 32 with its lower end projecting into a slot 138 in the tool 30 in which the spring is free to move a substantial distance lengthwise of the tool. When the tool 30 is moved forwardly into position between the body portion 10 of the insole-positioning device and the insole, the lower end of the spring 136 engages the edge of the body portion of the device and the spring is thereby subjected to stress, as shown in Figs. 3 and 4. As soon as the insole-positioning device is lifted clear of the shoe the spring 136 acts to discharge the device from the tool. To receive the device as it falls there is provided a receptacle 140 on the housing 28. In case the device, as it is lifted from the shoe and discharged in the manner described, should under any conditions tend to fly forward or upward farther than usual, there is provided means for preventing the operator from being hit by the device and also for deflecting the latter into the receptacle 140. This means comprises an upwardly and rearwardly inclined bracket 142 detachably secured to the front end of the bracket 40, to which is secured a shield or deflector 144 which is preferably made of celluloid and is, therefore, transparent so as not to interfere with the operator's view of the bottom of the shoe.

It is sometimes desired to use one or more tacks $t$ (Fig. 2) for holding the insole close to the last at the rear of the forepart. For the purpose of removing such tack or tacks the machine is further provided with a rotary tack puller 146 of a well-known type which is driven by a pinion 148 engaged and operated by the gear wheel 130.

In the use of the machine the operator presents a shoe with the bottom of its forepart in engagement with the shoe rest members 42 and 46 which determine the plane in which the bottom face of the forepart of the insole is positioned, the operator determining by sight the proper position of the shoe lengthwise and laterally and in respect to movement about a vertical axis. As the shoe is thus moved upwardly into engagement with the shoe rest members the insole engages the tool 30 which is initially positioned a little below the plane determined by these members, and by the upward movement of the shoe the tool is lifted to that plane so that it is in engagement with the insole when it starts its operative movement. The operator then depresses the treadle 88 to start the machine. The tool 30 moves first slidingly along the bottom face of the insole, in response to the action of the cam 60, to a position between that face and the body portion 10 of the insole-positioning device, the latter being raised somewhat by the wedging action of the tool in that movement, as illustrated in Figs. 3 and 5. By that movement of the tool, moreover, the spring 136 is carried into engagement with the edge of the body portion 10 of the positioning device and is subjected to bending stress preparatory to its later action in discharging the device from the tool. The tool is next moved upwardly by the cam 70 to withdraw the projections 12 from the holes in the last and insole, as illustrated in Fig. 4. As soon as the projections are thus withdrawn from the holes, the spring 136 acts to discharge the device from the tool so that it falls into the receptacle 140. The path of movement of the tool in its operation to remove the device and in its return to starting position is illustrated by the line $x$ (Fig. 4). As soon as the tool arrives in its starting position the cam shaft 62 is automatically disconnected from the driving means by the controlling mechanism hereinbefore described, whether the operator has or has not removed his foot from the treadle. As soon as the operator releases the treadle the mechanism shown in Fig. 6 acts to re-establish operative connection between the treadle and the clutch-controlling lever 86 ready for the starting of the machine in operating on the next shoe.

It will be observed that the removing tool 30 is of such width as to engage the body portion 10 of the insole-positioning device close to the projections 12, as illustrated by Fig. 5. By reason of this construction and the character of the movement imparted to the tool it acts to withdraw the two projections 12 simultaneously from the holes in the last and insole, so that there is no danger of distorting or breaking the device by twisting either one of the projections in the hole in the last. Furthermore, the device engaged near its ends by the tool as above described is removed with less strain thereon than if the force of the tool were applied thereto in a location midway between its two projections, in which case the force would tend to cramp the projections still harder in the holes in the last. This serves further to obviate the danger of breakage.

Having described the invention, what I claim as new and desire to secure by Letters Patent of the United States is:—

1. In a machine for removing from a shoe on a last an insole-positioning device having a body portion overlying the bottom face of the insole and spaced projections extending through the insole into holes in the last, the combination of a removing tool comprising a plate constructed to engage said device in close relation to its different projections simultaneously and arranged to extend in generally parallel relation to the the bottom face of the insole, and mechanism for effecting relative movement of said tool and the shoe to remove the device from the shoe.

2. In a machine for removing from a shoe on a last an insole-positioning device having a body portion overlying the bottom face of the insole and spaced projections extending through the insole into holes in the last, the combination of means so formed as to adapt it to be inserted between the body portion of said device and the insole from one side only of the device, and mechanism for effecting relative movement of said means and the shoe to withdraw said different projections simultaneously from the holes in the last.

3. In a machine for removing from a shoe on a last an insole-positioning device having a body portion overlying the bottom face of the insole and spaced projections extending through the insole into holes in the last, the combination of a tool so formed as to adapt it to be inserted between the body porton of said device and the insole, and means for moving said tool along the bottom face of the insole in a direction substantially parallel to said face thus to insert it and for also effecting relative movement of the tool and the shoe in a direction heightwise of the shoe to remove said device from the shoe.

4. In a machine for removing from a shoe on a last an insole-positioning device having a body portion overlying the bottom face of the insole and spaced projections extending through the insole into holes in the last, the combination of a tool so formed as to adapt it to be inserted between the body portion of said device and the insole, and cams arranged to operate in automatically determined time relation to each other to move the tool along the bottom face of the insole in a direction substantially parallel to said face thus to insert it and to move it in a direction heightwise of the shoe to remove said device from the shoe.

5. In a machine for removing from a shoe on a last an insole-positioning device having a body portion overlying the bottom face of the insole and spaced projections extending through the insole into holes in the last, the combination of a tool so formed as to adapt it to be inserted between the body portion of said device and the insole, an arm supporting said tool, a cam-operated lever connected to said arm for moving the tool along the bottom face of the insole thus to insert it, and another cam-operated lever connected to said arm for swinging it about its connection with the first-mentioned lever to move the tool in a direction heightwise of the shoe to remove said device from the shoe.

6. In a machine for removing from a shoe on a last an insole-positioning device having a body portion overlying the bottom face of the insole and spaced projections extending through the insole into holes in the last, the combination of a tool having a beveled edge to adapt it to be inserted between the body portion of said device and the insole by movement along the bottom face of the insole in a direction substantially parallel to said face, and operating means for thus moving said tool and for also moving it in a direction heightwise of the shoe to remove said device from the shoe.

7. In a machine for removing from a shoe on a last an insole-positioning device having a body portion overlying the bottom face of the insole and having at its opposite ends projections extending through the insole into holes in the last, the combination of a removing tool comprising a plate so formed as to adapt it to be inserted between the body portion of said device and the insole and arranged to extend in generally parallel relation to the bottom face of the insole, said tool approximating in width the length of the body portion of the device, and means for operating the tool to remove said device from the shoe.

8. In means for removing from a shoe on a last an insole-positioning device having a body portion overlying the bottom face of the insole and having at its opposite ends projections extending through the insole into holes in the last, a removing tool so formed as to adapt it to be inserted between the body portion of said device and the insole from one side only of the device by movement along the bottom face of the insole, said tool approximating in width the length of the body portion of the device and having an insole-engaging face substantially straight lengthwise of the tool throughout the area of engagement of the tool with the insole.

9. In means for removing from a shoe on a last an insole-positioning device having a body portion overlying the bottom face of the insole and having at its opposite ends projections extending through the insole into holes in the last, a removing tool so formed as to adapt it to be inserted between the body portion of said device and the insole by movement along the bottom face of the insole from one side only of the device, said tool approximating in width the length of the body portion of the device and having spaced projections with edges beveled on the opposite side from the insole to facilitate its insertion between that portion of the device and the insole.

10. In a machine for removing from a shoe on a last an insole-positioning device having a body portion overlying the bottom face of the insole and spaced projections extending through the insole into holes in the last, the combination of a tool so formed as to adapt it to be inserted between the body portion of said device and the insole, said tool having an edge beveled on the opposite side from the insole to facilitate such insertion, and means for moving the tool along the bottom face of the insole in sliding engagement with said face thus to insert it.

11. In a machine for removing from a shoe on a last an insole-positioning device having a body portion overlying the bottom face of the insole and spaced projections extending through the insole into holes in the last, the combination of a tool movable along the bottom face of the insole to a position between said face and the body portion of the device, said tool being formed to act as a wedge member for partially removing said device from the shoe during that movement, and means for operating the tool to complete the removal of said device.

12. In a machine for removing from a shoe on a last an insole-positioning device having a body portion overlying the bottom face of the insole and spaced projections extending through the insole into holes in the last, the combination of a tool so formed as to adapt it to be inserted between the body portion of said device and the insole, said tool being arranged to engage the bottom face of the insole when the shoe is initially presented to the machine, and means for operating said tool comprising mechanism for moving it along the bottom face of the insole in a direction substantially parallel to said face to insert it between the insole and the body portion of said device.

13. In means for removing from a shoe on a last an insole-positioning device having a body portion overlying the bottom face of the insole and spaced projections extending through the insole into holes in the last, the combination of a tool so formed as to adapt it to be inserted between the body portion of said device and the insole, and means for engaging the shoe to position it in relation to said tool.

14. In means for removing from a shoe on a last an insole-positioning device having a body portion overlying the bottom face of the insole and spaced projections extending through the insole into holes in the last, the combination of a tool so formed as to adapt it to be inserted between the body portion of said device and the insole, and means for determining by engagement with the bottom of the shoe the plane in which that portion of the bottom face of the insole adjacent to said device is presented in relation to the tool.

15. In a machine for removing from a shoe on a last an insole-positioning device having a body portion overlying the bottom face of the insole and spaced projections extending through the insole into holes in the last, the combination of a remover and mechanism for operating it to remove said device from the shoe, and a shoe rest constructed and arranged to provide a three-point bearing in engagement with the bottom of the shoe to determine the position of the shoe in relation to said remover.

16. In a machine for removing from a shoe on a last an insole-positioning device having a body portion overlying the bottom face of the insole and spaced projections extending through the insole into holes in the last, the combination of a tool so formed as to adapt it to be inserted between the body portion of said device and the insole, operating means for moving the tool along the bottom face of the insole thus to insert it, and means for engaging the bottom face of the insole to determine the plane in which that portion of said face adjacent to said device is positioned for the operation of the tool.

17. In a machine for removing from a shoe on a last an insole-positioning device having a body portion overlying the bottom face of the insole and spaced projections extending through the insole into holes in the last, the combination of a tool so formed as to adapt it to be inserted between the body portion of said device and the insole, operating means for moving the tool along the bottom face of the insole thus to insert it, and means constructed and arranged to provide a three-point bearing for engaging the bottom of the shoe in the hands of the operator to determine the relation of the bottom of the shoe to the path of movement of the tool.

18. In a machine for removing from a shoe on a last an insole-positioning device having a body portion overlying the bottom face of the insole and spaced projections extending through the insole into holes in the last, the combination of a tool so formed as to adapt it to be inserted between the body portion of said device and the insole, and operating means for moving the tool along the bottom face of the insole thus to insert it, said tool being so mounted as to permit it to receive a positioning movement prior to its operation in response to pressure of the bottom of the shoe against it.

19. In a machine for removing from a shoe on a last an insole-positioning device having a body portion overlying the bottom face of the insole and spaced projections extending through the insole into holes in the last, the combination of a tool so formed as to adapt it to be inserted between the body portion of said device and the insole by movement along the bottom face of the insole, operating means for thus moving said tool, and a shoe rest for engaging the bottom of the shoe to determine the relation of the shoe bottom to the path of movement of the tool, said tool being so mounted and controlled as to permit it to be moved by engagement of the bottom of the shoe therewith into a position determined by the shoe rest as the shoe is presented in engagement with the shoe rest.

20. In a machine for removing from a shoe on a last an insole-positioning device having a body portion overlying the bottom face of the insole and spaced projections extending through the insole into holes in the last, the combination of a tool so formed as to adapt it to be inserted between the body portion of said device and the insole by movement along the bottom face of the insole, operating means for thus moving said tool, and a shoe rest constructed and arranged to provide a three-point bearing in engagement with the bottom of the shoe presented bottom upward for determining the relation of the insole to the path of movement of the tool, said tool being so mounted and controlled as to be presented initially below the plane determined by said three-point bearing to cause it to be lifted by engagement of the shoe therewith as the shoe is presented in engagement with the shoe rest.

21. In a machine for removing from a shoe on a last an insole-positioning device having a body portion overlying the bottom face of the insole and spaced projections extending through the insole into holes in the last, the combination of a tool and means for operating it to remove said device from the shoe, and a shoe rest for engaging the bottom of the shoe presented bottom upward in the hands of the operator to determine the relation of the bottom face of the insole to the path of movement of the tool while enabling the operator to determine the position of the shoe lengthwise and laterally, the machine being so constructed as to afford the operator a view of that portion of the bottom of the shoe where the insole-positioning device is located to facilitate the proper positioning of the shoe.

22. In a machine for removing from a shoe on a last an insole-positioning device having a body portion overlying the bottom face of the insole and spaced projections extending through the insole into holes in the last, the combination of a tool and means for operating it to remove said device from the shoe, and a shoe rest constructed to provide a three-point bearing in engagement with the bottom of the shoe in the hands of the operator to determine the relation of the bottom face of the insole to the path of movement of the tool while enabling the operator to determine the position of the shoe lengthwise and laterally, the machine being so constructed as to afford the operator a view of the tool and of that portion of the shoe bottom where the insole-positioning device is located to assist him in positioning the shoe in proper relation to the tool.

23. In a machine for removing from a shoe on a last an insole-positioning device having a body portion overlying the bottom face of the insole and spaced projections extending through the insole into holes in the last, the combination of a tool and means for operating it to remove said device from the shoe, a shoe rest constructed and arranged to engage the bottom of the shoe in the hands of the operator while affording the operator a view of that portion of the bottom of the shoe where the insole-positioning device is located, and a transparent shield mounted between the operator and that portion of the bottom of the shoe.

24. In a machine for removing from a shoe on a last an insole-positioning device having a body portion overlying the bottom face of the insole and spaced projections extending through the insole into holes in the last, the combination of a tool for removing said device from the shoe, and means for discharging said device from the tool after its removal from the shoe.

25. In a machine for removing from a shoe on a last an insole-positioning device having a body portion overlying the bottom face of the insole and spaced projections extending through the insole into holes in the last, the combination of a tool for removing said device from the shoe, and a resilient member arranged to act by its resiliency to discharge said device from the tool.

26. In a machine for removing from a shoe on a last an insole-positioning device having a body portion overlying the bottom face of the insole and spaced projections extending through the insole into holes in the last, the combination of a tool and means for moving it along the bottom face of the insole to insert it between the body portion of said device and the insole and for also moving it heightwise of the shoe to remove the device from the shoe, and a spring constructed and arranged to be subjected to stress by engagement with said device as the tool is inserted between the device and the insole and to act on the device to discharge it from the tool after the removal of the device from the shoe.

In testimony whereof I have signed my name to this specification.

ARTHUR F. PYM.